United States Patent
Morfino

(10) Patent No.: US 12,545,355 B2
(45) Date of Patent: Feb. 10, 2026

(54) HYBRID-DRIVE MOTORCYCLE AND HYBRIDIZATION KIT FOR A MOTORCYCLE

(71) Applicant: EFESTO S.A.R.L., Paris (FR)

(72) Inventor: Luca Morfino, Pino Torinese (IT)

(73) Assignee: EFESTO S.A.R.L., Paris (FR)

( * ) Notice: Subject to any disclaimer, the term of this patent is extended or adjusted under 35 U.S.C. 154(b) by 855 days.

(21) Appl. No.: 17/774,373

(22) PCT Filed: Nov. 5, 2020

(86) PCT No.: PCT/IB2020/060422
§ 371 (c)(1),
(2) Date: May 4, 2022

(87) PCT Pub. No.: WO2021/090233
PCT Pub. Date: May 14, 2021

(65) Prior Publication Data
US 2022/0355885 A1    Nov. 10, 2022

(30) Foreign Application Priority Data

Nov. 5, 2019 (IT) .......................... 102019000020398

(51) Int. Cl.
*B62K 11/00* (2006.01)
*B62M 7/06* (2006.01)
*B62M 23/02* (2010.01)

(52) U.S. Cl.
CPC .............. *B62K 11/00* (2013.01); *B62M 7/06* (2013.01); *B62M 23/02* (2013.01)

(58) Field of Classification Search
CPC .......... B62K 11/00; B62M 7/06; B62M 23/02
See application file for complete search history.

(56) References Cited

U.S. PATENT DOCUMENTS 8,556,018 B2 * 10/2013 Fujihara ................... B62J 43/16
                                                         180/220
8,783,405 B2 *  7/2014 Irie ........................ B62K 11/04
                                                         180/312
(Continued)

FOREIGN PATENT DOCUMENTS

CN        1537750 A   * 10/2004
EP        2799321 A1  * 11/2014  ............ B60L 3/0046
(Continued)

OTHER PUBLICATIONS

International Search Report and Written Opinion in PCT Application No. PCT/IB2020/060422, mailed Feb. 18, 2021.
(Continued)

*Primary Examiner* — Jacob B Meyer
(74) *Attorney, Agent, or Firm* — Leason Ellis LLP

(57) ABSTRACT

A hybrid-drive motorcycle comprising an endothermic engine, a rear wheel connected to a carrier structure through a swingarm, a gearbox connected to the endothermic engine through a primary transmission and to the rear wheel through a secondary transmission, and a reversible electric machine, wherein an auxiliary transmission connects the electric machine to an input shaft of the secondary transmission, and wherein the electric machine is mounted on the carrier structure below the swingarm.

13 Claims, 4 Drawing Sheets

(56) References Cited

U.S. PATENT DOCUMENTS

| | | | | |
|---|---|---|---|---|
| 9,205,757 | B2 * | 12/2015 | Matsuda | H01M 50/264 |
| 9,238,495 | B2 * | 1/2016 | Matsuda | B60L 3/0046 |
| 11,007,882 | B2 * | 5/2021 | Matsushima | B60L 50/66 |
| 11,142,284 | B2 * | 10/2021 | Lund | B62M 6/70 |
| 2009/0223731 | A1 * | 9/2009 | Arnold | B62K 11/04 |
| | | | | 180/231 |
| 2012/0111651 | A1 * | 5/2012 | Irie | B62K 11/04 |
| | | | | 180/65.1 |
| 2022/0355885 | A1 * | 11/2022 | Morfino | B60W 30/18172 |
| 2024/0182135 | A1 * | 6/2024 | Morfino | B62M 29/00 |

FOREIGN PATENT DOCUMENTS

| | | | | |
|---|---|---|---|---|
| IT | 102018000010046 | B1 * | 10/2020 | |
| IT | 102019000020398 | B1 * | 10/2021 | |
| IT | 102021000010769 | B1 * | 5/2023 | |
| JP | H11303953 | A | 11/1999 | |
| JP | 2012101679 | A | 5/2012 | |
| JP | 2012148683 | A | 8/2012 | |
| JP | 2018158616 | A | 10/2018 | |
| JP | 2018203036 | A | 12/2018 | |
| WO | WO-2018173672 | A1 * | 9/2018 | B60K 6/387 |
| WO | WO-2019021227 | A1 * | 1/2019 | B62K 11/04 |

OTHER PUBLICATIONS

JP Notice of Refusal in JP Application No. 2022-526055, mailed Jul. 8, 2025, an English translation attached herewith (13 pages).

\* cited by examiner

HYBRID-DRIVE MOTORCYCLE AND HYBRIDIZATION KIT FOR A MOTORCYCLE

CROSS-REFERENCE TO RELATED APPLICATIONS

This patent application is a U.S. National Phase Application under 35 U.S.C. § 371 of International Patent Application No. PCT/IB2020/060422, filed on Nov. 5, 2020, which claims priority from Italian patent application no. 102019000020398 filed on Nov. 5, 2019, all of which are incorporated by reference, as if expressly set forth in their respective entireties herein.

TECHNICAL FIELD

This invention relates to a hybrid-drive motorcycle.

BACKGROUND ART

As is well known, the need to reduce fuel consumption and emissions has led to the increasing popularity of hybrid traction in the automotive field.

In the motorcycle field, hybrid traction is still not very widespread, and there is a need to optimise the integration between the endothermic engine and the electric machine in order to enable various riding modes with optimal performance and safety conditions.

There is, in addition, a need to minimise the dynamic problems deriving from the mass of the electric machine, and the greater difficulty of placing the electric machine in the reduced space available on a motorcycle.

DISCLOSURE OF INVENTION

The purpose of this invention is to provide a hybrid-drive motorcycle that makes it possible to overcome the above-mentioned drawbacks.

The above-mentioned purpose is achieved with a hybrid-drive motorcycle comprising a carrier structure, an endothermic engine mounted on or housed in the carrier structure, a front wheel, a rear wheel connected to the carrier structure through a swingarm, a gearbox connected to the endothermic engine through a primary transmission and to the rear wheel through a secondary transmission, and a reversible electric machine, characterised in that it comprises an auxiliary transmission connecting a shaft of the electric machine to an input shaft of the secondary transmission, and a support unit secured to the carrier structure and configured to support the electric machine below the swingarm.

The fact that the electric machine is connected to the input shaft of the secondary transmission makes it possible to completely bypass the endothermic engine in purely electric driving mode, switching off the endothermic engine and putting the gearbox in neutral, as well as driving the motorcycle without changing gears.

This arrangement also makes it possible to endow the electric machine with active anti-rearing or anti-spinning control functions by exerting a braking torque and simultaneously recharging the batteries without having to intervene on the power cut of the endothermic engine.

According to another aspect of the invention, the electric machine is located under the swingarm. This arrangement minimises the dynamic problems connected to the added mass of the electric machine, optimising motorcycle stability and riding safety.

According to a preferred embodiment of the invention, the electric machine is arranged basically symmetrically with respect to a vertical median plane of the motorcycle, which helps to optimise stability and safety.

According to a preferred embodiment of the invention, the electric machine can be selectively connected to the input shaft; in this way, in endothermic mode, it is possible to completely exclude the electric motor, avoiding the dragging of significant masses.

The electric machine is preferably counter-rotating with respect to the secondary transmission, so as to at least partially compensate for the gyroscopic effect of the wheels.

BRIEF DESCRIPTION OF THE DRAWINGS

These and other advantages will be evident from the following description of a non-limiting embodiment of the invention, with reference to the attached drawings in which.

BEST MODE FOR CARRYING OUT THE INVENTION

Figure 1:
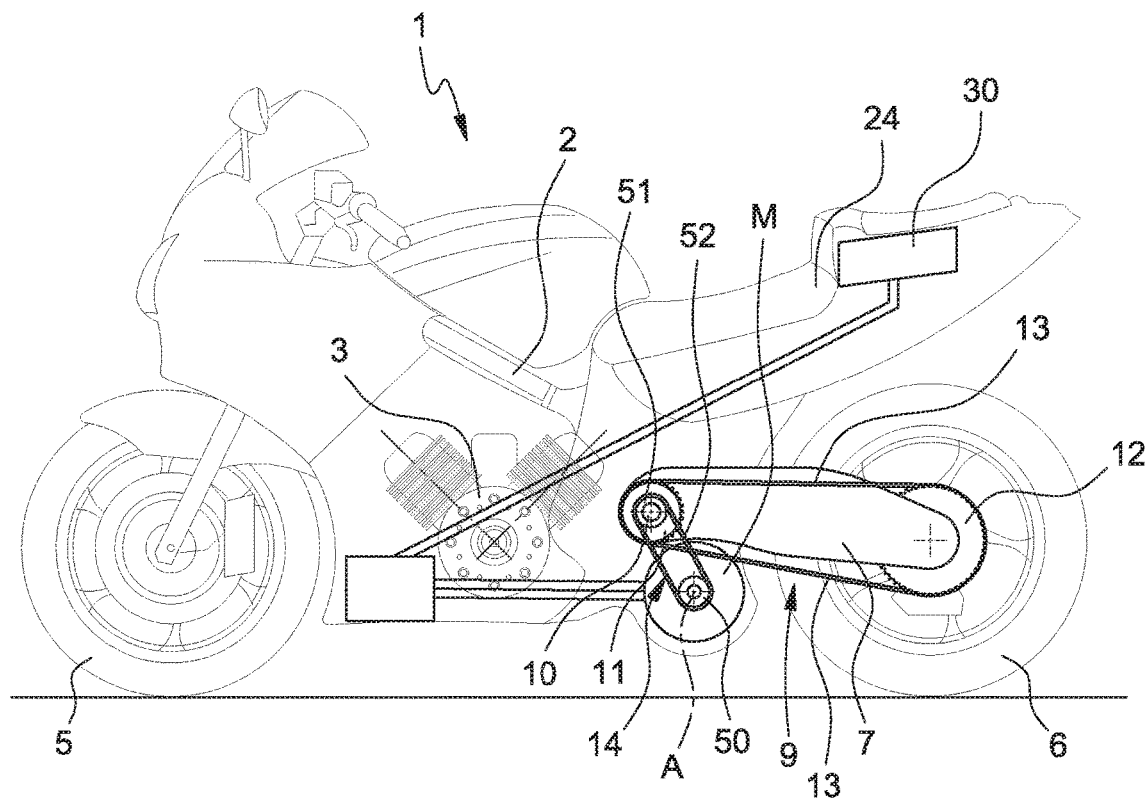
FIG. 1 is a schematic lateral view of a motorcycle made according to a first embodiment of this invention.

With reference to FIG. 1, the number 1 indicates, as a whole, a hybrid-drive motorcycle, in particular a motorbike, manufactured according to this invention.

Figure 2:
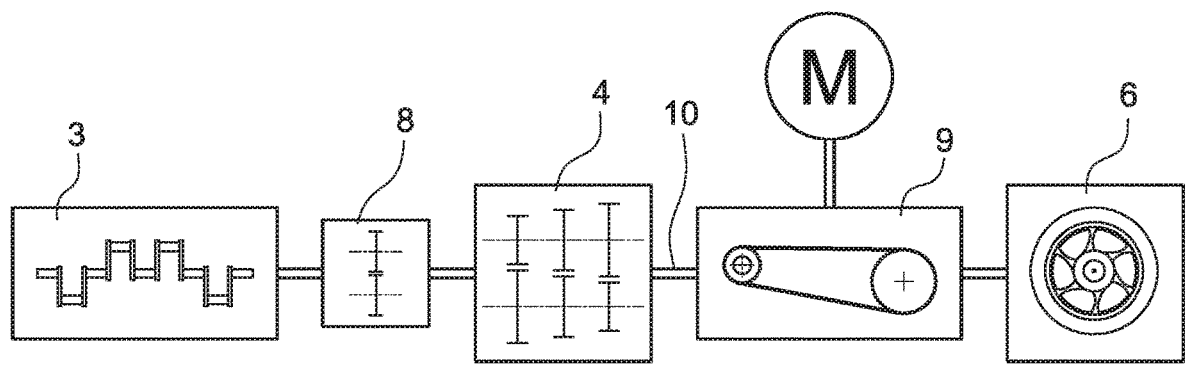
FIG. 2 is a block diagram of a traction unit of the motorcycle in FIG. 1.

The motorcycle 1 comprises, in a known way, a carrier structure 2 in which an endothermic engine 3 and a gearbox 4 are mounted or integrated (FIG. 2). The carrier structure 2 may consist of a frame on which a crankcase housing the engine and the gearbox is mounted, of just the crankcase (in the case of a motorcycle with a load-bearing engine), or intermediate solutions comprising a crankcase and a partial frame.

The motorcycle 1 is, in addition, equipped with a front wheel 5 and a rear wheel 6. The latter is attached to the carrier structure 2 by means of a swingarm 7, which is hinged to the carrier structure 2 at its front end and carries the wheel 6 at its rear end.

The motorcycle (FIG. 2) is equipped with a primary transmission 8, e.g. with gears, which connects a drive shaft of the endothermic engine 3 to the gearbox 4, and a secondary transmission 9, e.g. by a chain, which connects an output shaft 10 of the gearbox 4 to the rear wheel 6.

The output shaft 10 of the gearbox 4 is therefore the input shaft of the secondary transmission 9.

The secondary transmission 9 may comprise, for example, a pinion 11 placed on the shaft 10, a rear sprocket 12 attached to the rear wheel 6, and a chain 13 engaging with the pinion 11 and the rear sprocket 12 (FIG. 1).

Alternatively, the secondary transmission could be of any other known type, e.g. a toothed belt or drive shaft.

The motorcycle 1 also comprises an electric machine M that is permanently or selectively connected to the secondary transmission 9, and, in particular, to the input shaft 10 of the same. The electric machine is preferably an axial-flow permanent magnet machine, with an external rotor, and is arranged with its own axis A perpendicular to a median longitudinal plane P of the vehicle.

According to a first embodiment of the invention, illustrated in FIG. 1, the electric machine M is permanently connected to the input shaft 10 of the secondary transmission 9, for example by means of an auxiliary chain transmission 14 comprising a pinion 50 connected to an output shaft 18 of the electric machine, a pinion 51 firmly connected to the output shaft of the gearbox 10 and a chain 52. Alternatively, the auxiliary transmission 14 could be a gear or belt transmission.

Figure 3:
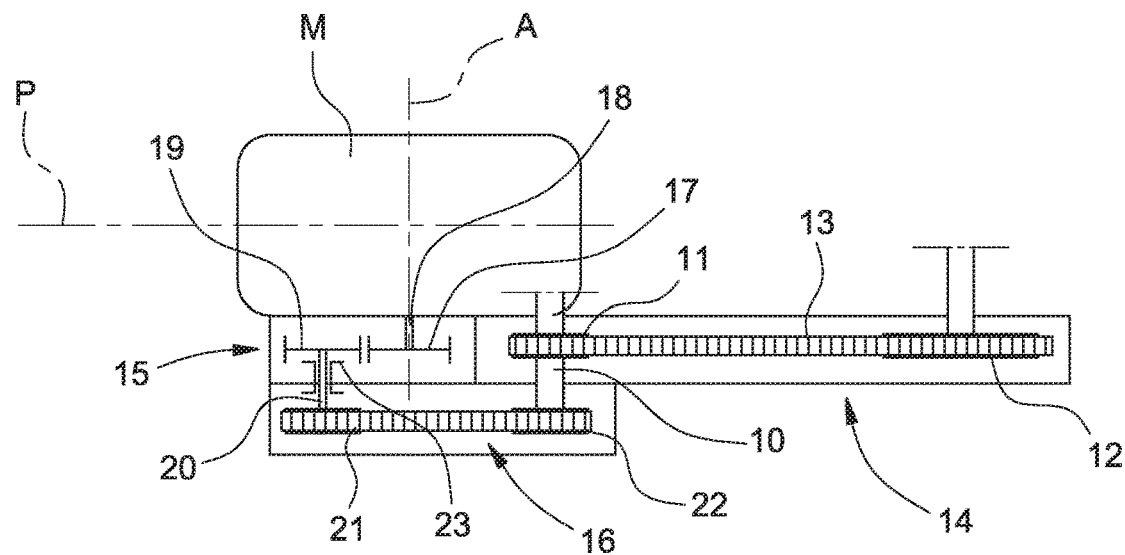
FIG. 3 is a diagram illustrating another embodiment of an auxiliary transmission of the motorcycle in FIG. 1.

According to another embodiment of this invention, schematically illustrated in FIG. 3, the auxiliary transmission 14 comprises a reversing/decoupling unit 15 and a belt transmission 16 in series with each other.

More specifically, the reversing/decoupling unit 15 comprises a first toothed wheel 17 integral with the output shaft 18 of the electric machine M and a second toothed wheel 19 that can be selectively engaged with an idle shaft 20.

Conveniently, the selective engagement of the toothed wheel 19 on the idle shaft 20 is implemented by means of a sliding sleeve 23 with front teeth, equipped with a synchroniser (not illustrated). The sleeve 23 acts as a decoupler for the electric machine M.

The belt transmission 16 comprises a first crown wheel on the idle shaft 20 and a second crown wheel 22 rotationally connected to the output shaft 10 of the gearbox 4.

According to this invention, the electric machine M is mounted on the carrier structure 2 below the swingarm 7. It should be noted that the expression "below the swingarm 7" is to be understood as meaning that at least the main part of the electric machine M and the axis A of the electric machine itself are located below the swingarm 7; if not all the electric machine M is located below the swingarm 7, the latter must be configured so as not to interfere with the overall dimensions of the electric machine M under static and dynamic conditions. For example, in the case of a two-arm swingarm, it is possible that a top portion of the electric machine M may be located at the same height as the swingarm 7 during at least part of its travel, in which case the transverse dimensions of the electric machine M must be located between the two arms of the swingarm 7, so that no interference occurs.

The electric machine M is conveniently arranged symmetrically in relation to a vertical median plane P of the motorcycle 1 (FIG. 3).

Figure 4:
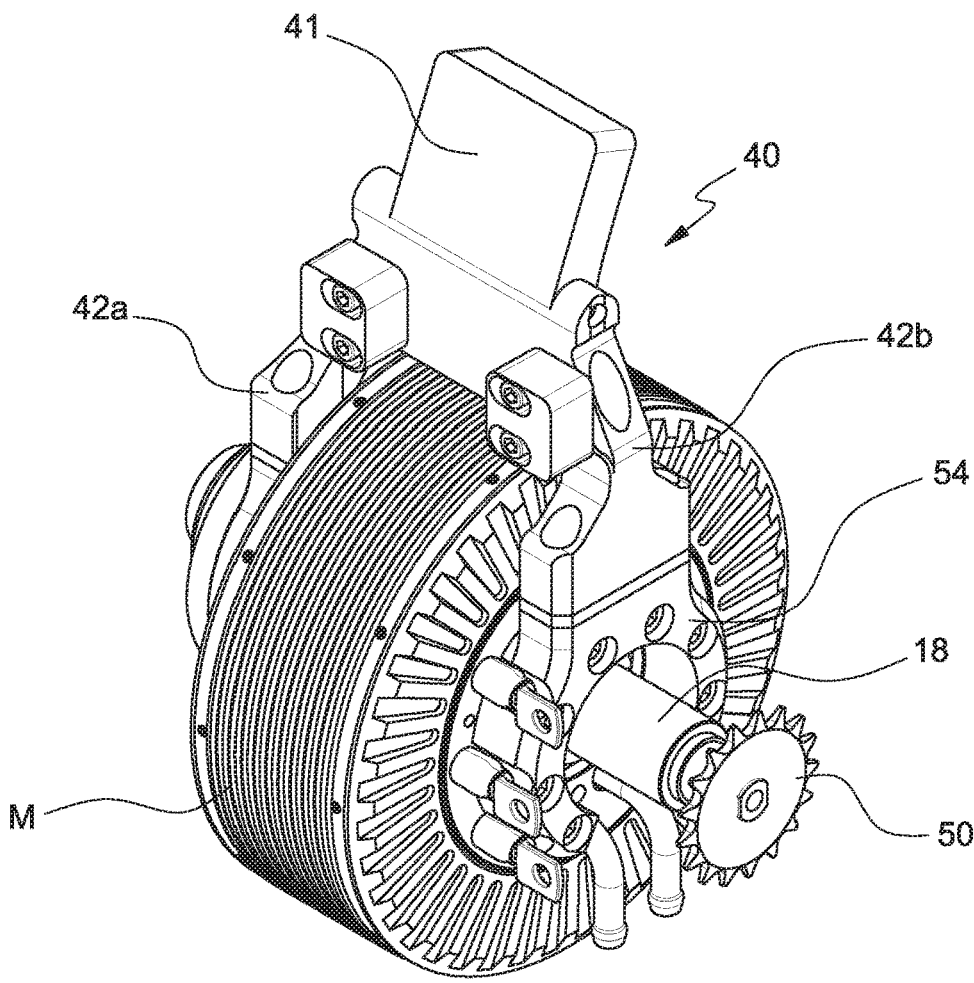
FIG. 4 is a perspective view of a first embodiment of a support unit of an electric machine of the motorcycle in FIG. 1.

FIG. 4 illustrates a first embodiment of a support unit 40 for connecting the electric machine M to the carrier structure 2.

The support unit 40 consists of a bracket comprising a top plate 41 designed to be arranged, in use, between the arms of the swingarm 7, in the transverse direction, and between the carrier structure 2 and the rear wheel 6, in the longitudinal direction. The top plate 41 is configured so that it can be fixed to the carrier structure 2 by means of screws and/or clamps, preferably using connection holes already existing in the structure itself (e.g. the swingarm 7 hinge holes). The unit 40 also comprises a pair of arms 42*a*, 42*b* extending downwards on opposite sides of the top plate 41 and arranged on axially opposite sides of the electric machine M.

One of the arms 42*a* is fixed to the stator of the electric machine M, the other arm 42*b* ends with a ring-shaped support 54 for the output shaft 18 of the electric machine M, within which the shaft 18 is supported by a bearing (not illustrated).

Figure 5:
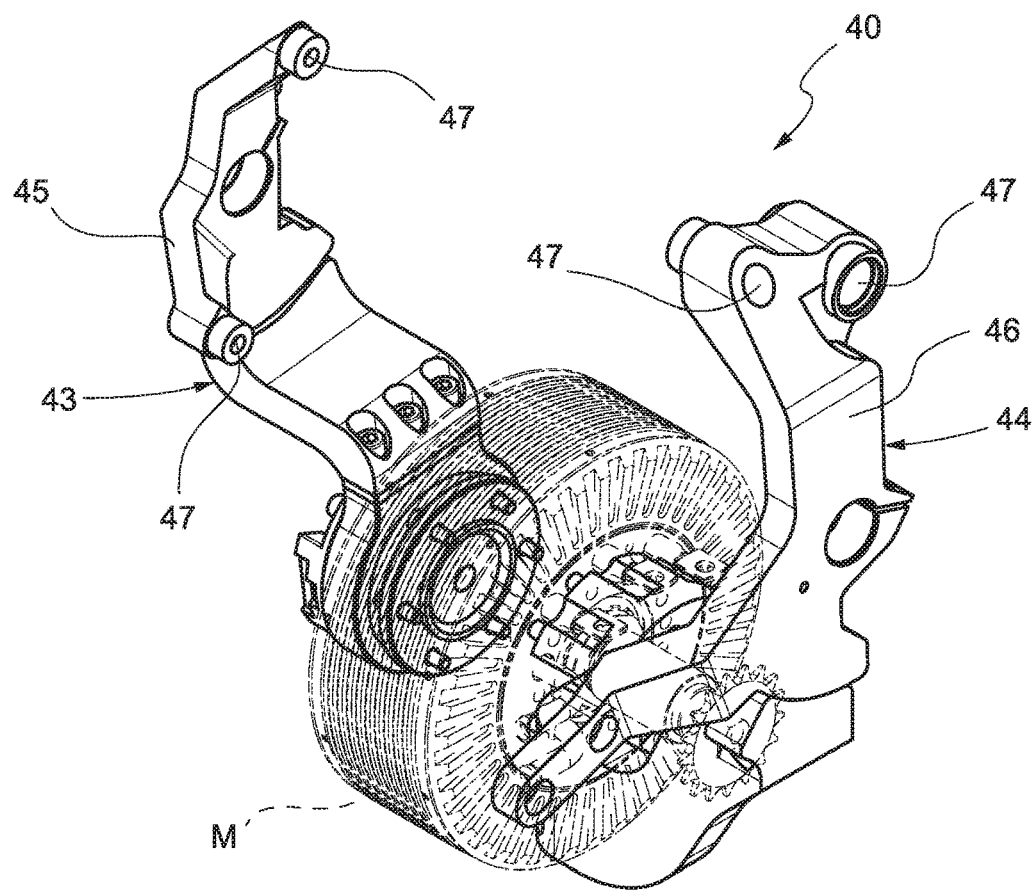
FIGS. 5 and 6 are, respectively, views in perspective and in front elevation of a second embodiment of the support unit of the electric machine of the motorcycle in FIG. 1.
Figure 6:
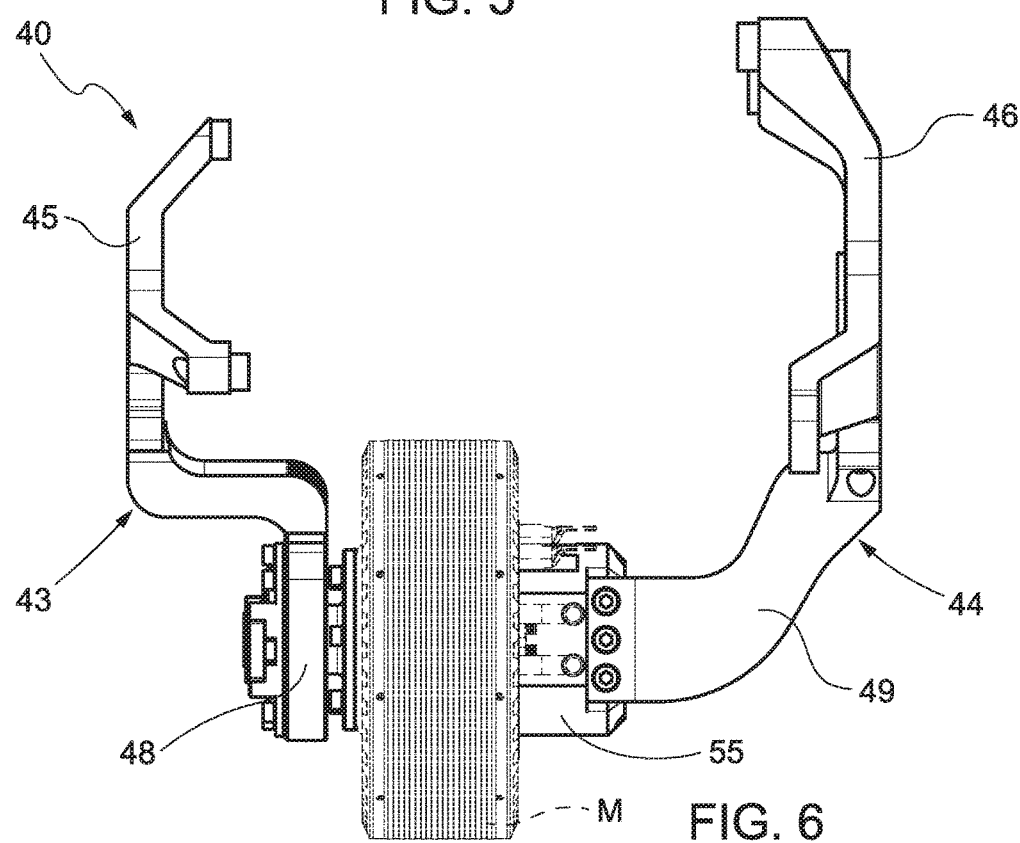

FIGS. 5 and 6 illustrate a different embodiment in which the unit 40 is composed of two brackets 43, 44 with respective top portions 45, 46 designed to be fixed to the opposite sides of the carrier structure 2 of the motorcycle 1, and for the purpose provided, with multiple fixing holes 47 each.

The brackets 43, 44 also comprise respective arms 48, 49 fixed to or integral with the top portions 45, 46 and extending downwards from axially opposite sides of the electric machine M. In this case too, the arm 48 is fixed to the stator of the electric machine M; the arm 49 terminates in a ring-shaped support 55 for the output shaft 18 of the electric machine M, within which the shaft 18 is supported by means of a bearing (not illustrated).

This solution is suitable for situations where there is not enough space to install a bracket between the arms of the swingarm 7, or where the swingarm is a single-arm one. The brackets 43, 44 are conveniently shaped so that they can be arranged outside the swingarm 7, defining enough space with the carrier structure 2 to enable the passage and vertical travel of the swingarm 7. This solution has larger dimensions than the previous one but is more flexible and can be easily adapted to different motorcycle models, using attachment holes already present on the carrier structure. For example, the brackets 43, 44 can replace the support brackets of the passenger pedals, and integrate the pedals themselves.

Figure 7:
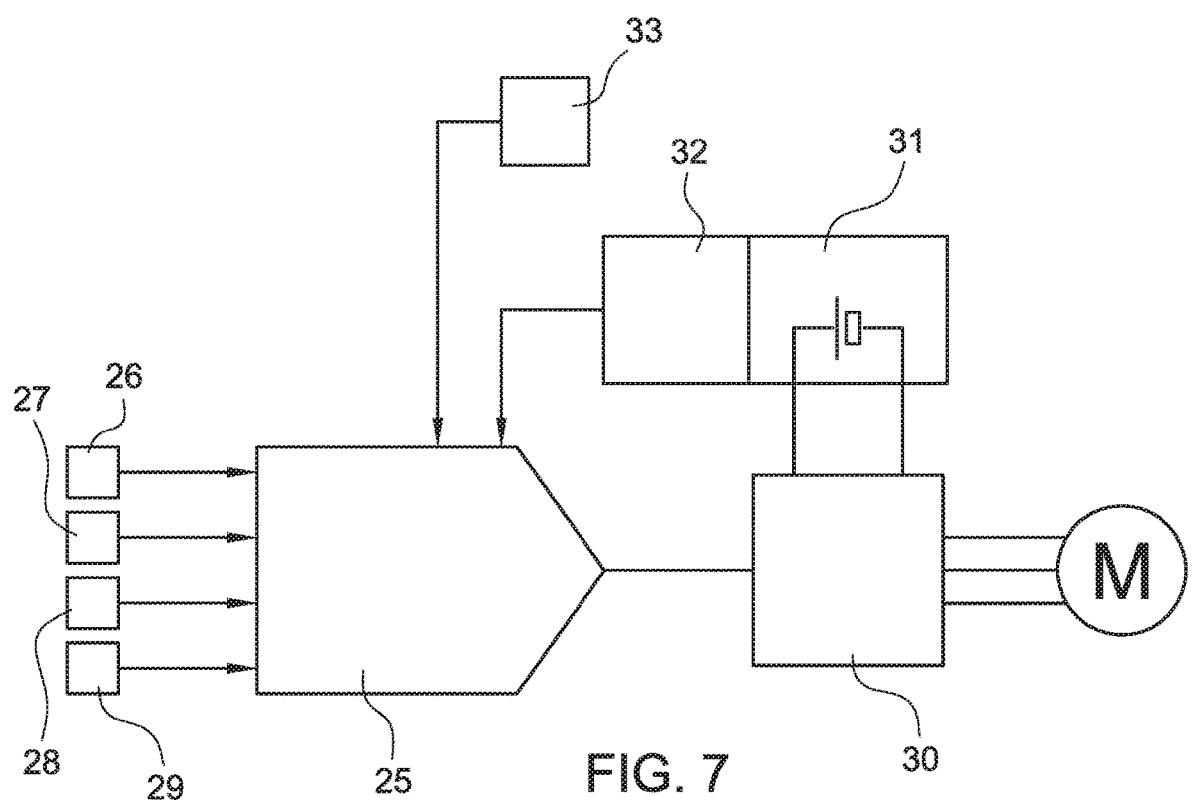
FIG. 7 is a block diagram of the control of the electric machine.

FIG. 7 illustrates a block diagram of the control of the electric machine M.

A microprocessor control unit 25 receives input signals from a number of on-board sensors, including—with reference to the functions concerned here—at least one lateral inclination or roll sensor 26, one inclination or rearing sensor 27, one front wheel 5 angular velocity sensor 28, and one rear wheel 6 angular velocity sensor 29.

The control unit 25 sends control signals to an inverter 30 joined to the electric machine M, which is connected to a battery pack 31 equipped with a management system (BMS) 32 that communicates with the control unit 25. The inverter 30 is conveniently attached to a lower area of the carrier structure 2 and housed as low as possible, e.g. in front of the endothermic engine 3 (FIG. 1). The battery pack 31 is conveniently fixed to the inside of a tail piece 24 of the motorcycle 1, below the seat.

The control unit also receives an input signal from an accelerator 33 in the form of a potentiometer conventionally controlled by a knob on the handlebar.

The operation of the hybrid traction system of the motorcycle 1 is as follows.

1. Endothermic Mode

The motorcycle 1 is conventionally driven by just the endothermic engine 3.

If there is an decoupler 15, the sleeve 23 is disengaged; the electric machine M is excluded from the kinematic chain, and only the belt transmission 16 is dragged idle, with negligible inertia.

2. Electric Mode

Keeping the gearbox 4 in neutral, (and the sleeve 23 engaged, if present) the motorcycle is driven by just the electric machine M. The endothermic engine 3 is isolated and therefore does not introduce any inertia to the unwanted rotation. When braking, the electric machine is used as a regenerative brake to recharge the battery 31.

3. Hybrid Mode

In this mode, both the endothermic engine 3 and the electric machine M are used simultaneously, so that the sum of the driving power ("boost") or braking power can thus be obtained, depending on the position of the accelerator 32. The control unit 25 distributes the torque between the endothermic engine 3 and the electric machine M on the basis of maps stored according to input signals, and in particular according to the speed, power demand, and load. In this case too, the electric machine M can be used as a regenerative brake to recharge the battery 31.

In this mode, complex control strategies can be implemented in particular operating situations that are identified on the basis of input signals, such as the following:

a. Anti-Rearing Control.

Incipient rearing can be detected as a sudden change in the inclination signal generated by the sensor 27. In particular, the condition can be detected by comparing the derivative over time of the value of this signal with a predetermined threshold value, exceeding which the electric machine M is operated as a regenerative brake to reduce the power discharged on the rear wheel 6. The electric machine can return to delivering driving torque when a reduction in the inclination is detected. This function can, therefore, be implemented in a simple way without intervening in the control maps of the endothermic engine 3.

b. Anti-Spinning Control.

The spinning condition, i.e. loss of rear wheel grip, can be detected by comparing the signals generated by the angular velocity sensors 28, 29 connected to the respective wheels. If the angular velocity of the rear wheel exceeds that of the front wheel, the electric machine M is used as a regenerative brake to reduce the speed of the rear wheel 6 and make it re-adhere. The electric machine can return to delivering driving torque when the angular velocities of the wheels are detected as being equal.

c. Acceleration Control when Cornering

The torque distribution maps between the thermal engine 3 and the electric machine M can be modified according to the lateral inclination or roll angle of the motorcycle.

In particular, it may be configured so that the torque contribution of the electric machine cancels out at a value of the maximum permissible inclination angle, and increase progressively as the inclination angle decreases (i.e. when exiting a curve). The mapping can be performed using not only the inclination angle but also the speed as input parameter.

Lastly it is clear that modifications and variations may be made to the motorcycle described without thereby departing from the scope of protection as defined by the claims.

For example, the reversing/decoupling unit, if present, can be configured as a two-speed gearbox, in order to define a "short" gear, for obtaining a high breakaway torque in electric mode, and a "long" gear, to be used when the electric machine is used as a boost in combination with the endothermic engine.

The electric machine, the support unit, and its control and supply means (inverter and battery) can also be supplied separately as a hybridization kit that can be applied to a conventional motorcycle that only has a thermal engine. The kit may conveniently comprise an interchangeable tail piece with the original motorcycle tail piece, in which the battery is integrated.

In addition, the motorcycle features described in combination with each other can be used independently, and in different combinations.

The invention claimed is:

1. A hybrid-drive motorcycle comprising a carrier structure, an internal combustion engine mounted on or housed in the carrier structure, a front wheel, a rear wheel connected to the carrier structure through a swingarm, a gearbox connected to the internal combustion engine through a primary transmission and to the rear wheel through a secondary transmission, and a reversible electric machine, characterized by comprising an auxiliary transmission connecting the electric machine to an input shaft of the secondary transmission, and a support unit secured to the carrier structure and configured to support the electric machine below the swingarm.

2. A motorcycle as claimed in claim 1, wherein the electric machine is arranged substantially symmetrically with respect to a vertical median plane of the motorcycle.

3. A motorcycle as claimed in claim 1, wherein the electric machine is counter-rotating with respect to the secondary transmission.

4. A motorcycle as claimed in claim 1, wherein the auxiliary transmission comprises a reversing/decoupling unit configured to selectively connect the electric machine to the input shaft of the secondary transmission.

5. A motorcycle as claimed in claim 4, wherein the reversing/decoupling unit comprises a first toothed wheel integral with an output shaft of the electric machine and a second toothed wheel selectively connectable to an idle shaft.

6. A motorcycle as claimed in claim 5, wherein the auxiliary transmission comprises a transmission connecting the idle shaft to the input shaft of the secondary transmission.

7. A motorcycle as claimed in claim 1, further comprising an inverter connected to a lower area of the carrier structure.

8. A motorcycle as claimed in claim 1, further comprising a control unit configured to vary the driving and braking torque of the electric machine in response to input signals received from a roll angle sensor, a rearing angle sensor, a front wheel angular velocity sensor and a rear wheel angular velocity sensor.

9. A motorcycle as claimed in claim 8, wherein said control unit is configured to perform a rearing control in which the electric machine generates a braking torque as a function of the derivative of the inclination angle.

10. A motorcycle as claimed in claim 8, wherein said control unit is configured to perform a torque control in which the driving torque generated by the electric machine is modulated as a function of the roll angle.

11. A motorcycle as claimed in claim 8, wherein said control unit is configured to perform an anti-spinning control in which the electric machine generates a braking torque when the angular velocity of the rear wheel is greater than the angular velocity of the front wheel.

12. A motorcycle as claimed in claim 1, wherein the support unit (40) comprises a bracket fixed to the carrier structure (2) and provided with a pair of arms supporting the electric machine (M) from axially opposite sides.

13. A motorcycle as claimed in claim 1, wherein the support unit comprises a pair of brackets fixed to opposite sides of the carrier structure and configured so as to extend externally with respect to the swingarm, the brackets being connected to the electric machine on axially opposite sides.

* * * * *